US011405910B2

United States Patent
Nose et al.

(10) Patent No.: US 11,405,910 B2
(45) Date of Patent: Aug. 2, 2022

(54) BASE STATION, METHOD, PROGRAM AND RECORDING MEDIUM

(71) Applicant: NEC CORPORATION, Tokyo (JP)

(72) Inventors: Daisuke Nose, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/977,729

(22) PCT Filed: Feb. 19, 2019

(86) PCT No.: PCT/JP2019/006010
§ 371 (c)(1),
(2) Date: Sep. 2, 2020

(87) PCT Pub. No.: WO2019/176468
PCT Pub. Date: Sep. 19, 2019

(65) Prior Publication Data
US 2021/0068088 A1 Mar. 4, 2021

(30) Foreign Application Priority Data
Mar. 14, 2018 (JP) .............................. JP2018-046388

(51) Int. Cl.
*H04W 72/04* (2009.01)
*H04B 7/06* (2006.01)
*H04L 5/00* (2006.01)

(52) U.S. Cl.
CPC ........ *H04W 72/042* (2013.01); *H04B 7/0626* (2013.01); *H04L 5/0048* (2013.01); *H04W 72/0413* (2013.01)

(58) Field of Classification Search
CPC ............ H04W 72/0048; H04W 72/042; H04B 7/0626; H04L 5/0048
See application file for complete search history.

(56) References Cited

U.S. PATENT DOCUMENTS

| 2003/0128658 A1 | 7/2003 | Walton et al. |
| 2010/0315962 A1 | 12/2010 | Imai et al. |

(Continued)

FOREIGN PATENT DOCUMENTS

| EP | 2099232 A1 | 9/2009 |
| JP | 2006-520109 A | 8/2006 |
| JP | 2013-538484 A | 10/2013 |
| WO | 2008/081857 A1 | 7/2008 |

OTHER PUBLICATIONS

Mitsubishi Electric, "Necessity of checking channel reciprocity in TDD", 3GPP TSG RAN WG1 #58 meeting, Aug. 24-28, 2009, R1-093147, pp. 1-5.

(Continued)

*Primary Examiner* — Ronald B Abelson
(74) *Attorney, Agent, or Firm* — Sughrue Mion, PLLC

(57) ABSTRACT

Even if the channel reciprocity established between the uplink and the downlink is deteriorated, control the transmission in the downlink is performed properly. A base station 100 includes: an information obtaining unit 143 configured to obtain downlink channel information based on a downlink channel estimate, and uplink channel information based on an uplink channel estimate; and a control unit 145 configured to perform control related to transmission in downlink channel based on a correlation between the downlink channel information and the uplink channel information.

12 Claims, 8 Drawing Sheets

(56) References Cited

U.S. PATENT DOCUMENTS

| | | |
|---|---|---|
| 2013/0114478 A1 | 5/2013 | Shi et al. |
| 2014/0153427 A1* | 6/2014 | Seo et al. |
| 2015/0043469 A1* | 2/2015 | Kim .................. H04B 7/26 |
| 2015/0304960 A1* | 10/2015 | Yang .................. H04L 1/0045 |
| 2019/0261367 A1* | 8/2019 | Wu .................. H04L 5/0094 |

OTHER PUBLICATIONS

International Search Report for PCT/JP2019/006010 dated May 21, 2019 [PCT/ISA/210].
Written Opinion for PCT/JP2019/006010 dated May 21, 2019 [PCT/ISA/239].
English translation of Written opinion for PCT Application No. PCT/JP2019/006010, dated May 21, 2019.
Extended European Search Report for EP Application No. EP19768074.7 dated Feb. 19, 2021.
Mitsubishi Electric, "Necessity of checking channel reciprocity in TDD", 3GPP Draft; R1-100551, 3GPP TSG RAN WG1 #59bis meeting, pp. 1-4, Jan. 12, 2010, Spain.
Qualcomm Incorporated, "UL MIMO Transmission Schemes", 3GPP Draft; R1-1700797, 3GPP TSG RAN WG1 RAN1 NR AdHoc, pp. 1/2-6/2, Jan. 16, 2017, USA.
Japanese Office Action for JP Application No. 2020-505719 dated Nov. 16, 2021 with English Translation.
Japanese Office Action for JP Application No. 2020-505719 dated May 31, 2022 with English Translation.

* cited by examiner

BASE STATION, METHOD, PROGRAM AND RECORDING MEDIUM

CROSS REFERENCE TO RELATED APPLICATIONS

This application is a National Stage of International Application No. PCT/JP2019/006010 filed Feb. 19, 2019, claiming priority based on Japanese Patent Application No. 2018-046388 filed Mar. 14, 2018.

BACKGROUND

Technical Field

The present invention relates to a base station, a method, a program and a recording medium for a radio access network.

Background Art

In a radio access network, channel quality is estimated based on channel reciprocity established between the uplink and the downlink.

For example, Patent Literature 1 describes selecting at least one user terminal as a calibration user terminal for calibrating the reciprocity error between the uplink and the downlink, according to channel quality-related information between a number of user terminals and a base station, for the purpose of improving the accuracy of calibrating the reciprocity error between the uplink and the downlink.

CITATION LIST

Patent Literature

[PTL 1] JP 2013-538484 T

SUMMARY

Technical Problem

However, with technologies including Patent Literature 1, if the channel reciprocity established between the uplink and the downlink is not ideal and is deteriorated, a base station is unable to properly perform control related to transmission in the downlink, including, for example, scheduling in the downlink.

It is therefore an example object of the present invention to provide a base station, a method, a program, and a recording medium that make it possible to properly perform control related to transmission in the downlink, even when the channel reciprocity that is established between the uplink and the downlink is deteriorated.

Solution to Problem

According to one example aspect of the present invention, a base station includes an information obtaining unit configured to obtain downlink channel information based on a downlink channel estimate, and uplink channel information based on an uplink channel estimate, and a control unit configured to perform control related to transmission in downlink channel based on a correlation between the downlink channel information and the uplink channel information.

According to one example aspect of the present invention, a method includes obtaining downlink channel information based on a downlink channel estimate, and uplink channel information based on an uplink channel estimate, and performing control related to transmission in downlink channel based on a correlation between the downlink channel information and the uplink channel information.

According to one example aspect of the present invention, a program that causes a processor to execute obtaining downlink channel information based on a downlink channel estimate, and uplink channel information based on an uplink channel estimate, and performing control related to transmission in downlink channel based on a correlation between the downlink channel information and the uplink channel information.

According to one example aspect of the present invention, a non-transitory computer-readable recording medium storing a program that causes a processor to execute obtaining downlink channel information based on a downlink channel estimate, and uplink channel information based on an uplink channel estimate, and performing control related to transmission in downlink channel based on a correlation between the downlink channel information and the uplink channel information.

Advantageous Effects of Invention

According to the present invention, even when the channel reciprocity that is established between the uplink and the downlink is deteriorated, it is still possible to properly perform control related to transmission in the downlink. Note that, according to the present invention, instead of or together with the above advantageous effects, other advantageous effects may be brought about.

DESCRIPTION OF THE EXAMPLE EMBODIMENTS

Figure 1:
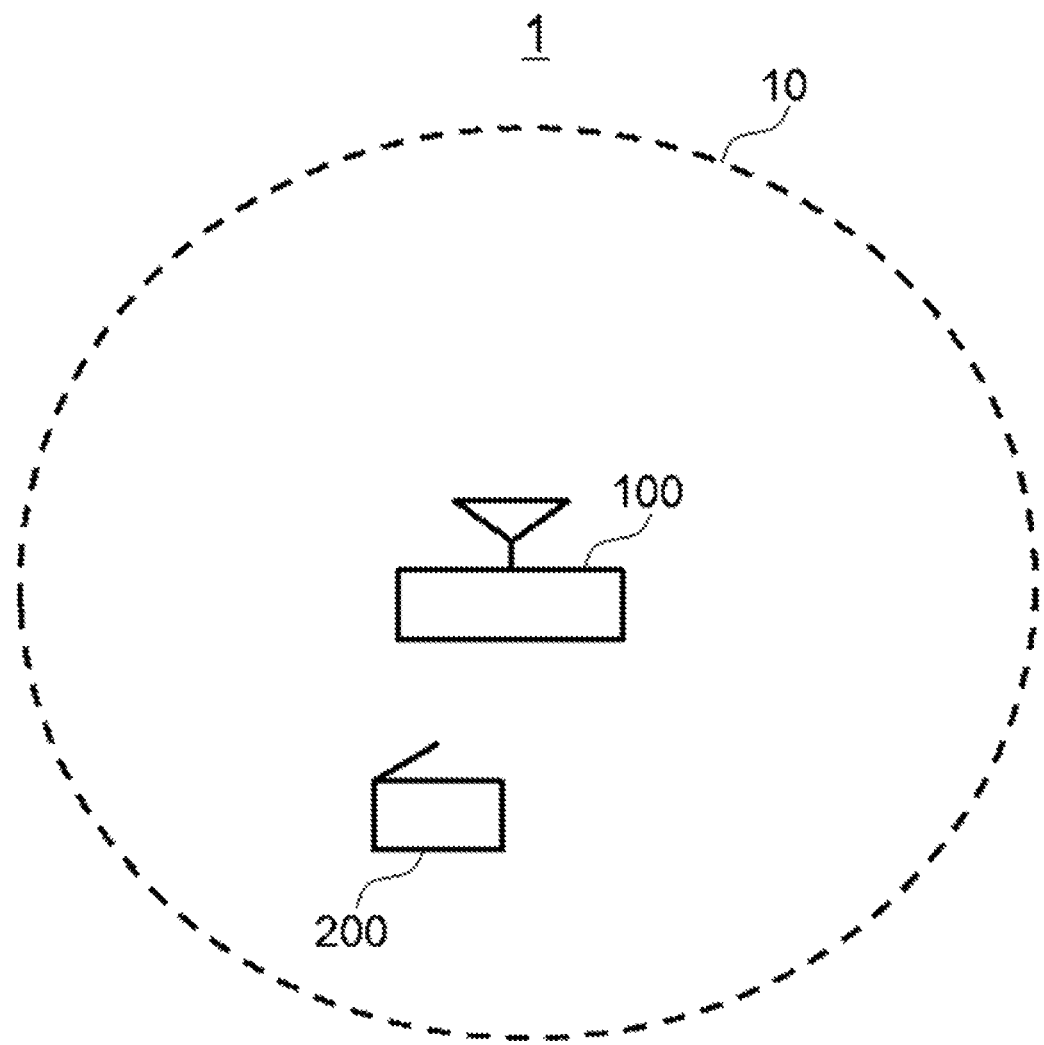
FIG. 1 is an explanatory diagram to show an example of a schematic configuration of a system 1 according to an example embodiment of the present invention.

Hereinafter, example embodiments of the present invention will be described in detail with reference to the accompanying drawings. Note that, in the Specification and drawings, elements that can be described in the same or similar terms will be assigned the same reference signs, and overlapping description may be omitted.

The description will be given in the following order:
1. Summary of example embodiments of the present invention
2. Configuration of system
3. First example embodiment
   3.1. Configuration of base station 100
   3.2. Configuration of terminal apparatus 200
   3.3. Technical features
   3.4. Example
4. Second example embodiment
   4.1. Configuration of base station 100
   4.2. Technical features
5. Other embodiments

1. SUMMARY OF EXAMPLE EMBODIMENTS OF THE PRESENT INVENTION

First, a summary of example embodiments of the present invention will be described.

(1) Technical Issues

In a radio access network, channel quality is estimated based on channel reciprocity established between the uplink and the downlink.

However, when the channel reciprocity established between the uplink (UL) and the downlink (DL) (also referred to as "UL-DL channel reciprocity") is not ideal and is deteriorated, even if a base station uses uplink channel estimates, it is still not possible to calculate the downlink beamforming/precoding weights by a large number of antenna elements accurately. That is, it is not possible to provide optimal beamforming/precoding weights for actual downlink channels, and therefore the quality of received signals at terminal apparatus may be deteriorated.

Also, the base station performs downlink transmission by using the number of layers (rank) per terminal apparatus, which does not take into account the deterioration of received signal quality at the terminals, and the modulation coding scheme (MCS) for each layer, and therefore the data decoding error rates at terminal apparatus increase.

Furthermore, if terminal apparatus where the UL-DL channel reciprocity is deteriorated uses DL multi-user-multiple-input multiple-output (MU-MIMO) technology, the quality of received signals is deteriorated in other terminal apparatus that are multiplexed in the same time/frequency resources.

Here, the following examples can be given as causes of deterioration of UL-DL channel reciprocity.

For example, firstly, the case in which the uplink transmission path when an uplink channel estimate is calculated and the downlink transmission path when a downlink channel estimate is calculated are different due to the movement of terminal apparatus and/or the like may be a possible cause of deterioration.

Secondly, for example, the case in which, when a number of transmitting/receiving antennas (transmitters/receivers) are provided in a base station, calibration to align the phase and the amplitude between the transmitting antennas, between the receiving antennas, and between the transmitting antenna group and the receiving antenna group is not implemented in an ideal way may be a possible cause of deterioration.

Thirdly, for example, the case in which, when terminal apparatus has a number of transmitting/receiving antennas (transmitters/receivers), the relative characteristic differences (for example, the phase, the amplitude, etc.) between the receivers vary significantly compared to the relative characteristic differences (for example, the phase, the amplitude, etc.) between the transmitters may be a possible cause of deterioration.

So, it is an example object of the present example embodiments to make it possible to properly perform control related to transmission in the downlink even when the channel reciprocity that is established between the uplink and the downlink is deteriorated.

(2) Technical Features

In the example embodiments of the present invention, for example, a base station obtains downlink channel information based on a downlink channel estimate and uplink channel information based on an uplink channel estimate, and performs control related to transmission in a downlink channel based on the correlation between the downlink channel information and the uplink channel information.

By this means, for example, even when the channel reciprocity that is established between the uplink and the downlink is deteriorated, it is still possible to properly perform control related to transmission in the downlink. Note that the above-described technical feature is a specific example of the example embodiments of the present invention, and, obviously, the example embodiments of the present invention are not limited to the above-described technical feature.

2. CONFIGURATION OF SYSTEM

With reference to FIG. 1, an example of the configuration of a system 1 according to an example embodiment of the present invention will be described. FIG. 1 is an explanatory diagram to show an example of a schematic configuration of the system 1 according to an example embodiment of the present invention. Referring to FIG. 1, the system 1 includes a base station 100 and terminal apparatus 200.

For example, the system 1 is a system in compliance with the standards/specifications of the third generation partnership project (3GPP). To be more specific, for example, the system 1 may be a system in compliance with the standards/specifications of LTE/LTE-Advanced and/or system architecture evolution (SAE). Alternatively, the system 1 may be a system in compliance with the standards/specifications of fifth generation (5G)/new radio (NR). Obviously, the system 1 is not limited to these examples.

(1) Base Station 100

The base station 100 is a node of a radio access network (RAN), and communicates, by radio, with terminal apparatus (for example, terminal apparatus 200) located in the coverage area 10.

For example, the base station 100 may be an evolved NodeB (eNB) or a generation Node B (gNB) in 5G. The base station 100 may include a number of units (or a number of nodes). These units (or nodes) may include a first unit (or a first node) that performs higher protocol layer processing and a second unit (or a second node) that performs lower protocol layer processing. In one example, the first unit may be referred to as a "center/central unit (CU)", and the second unit may be referred to as a "distributed unit (DU)" or an "access unit (AU)". In another example, the first unit may be referred to as a "digital unit (DU)", and the second unit may be referred to as a "radio unit (RU)" or a "remote unit (RU)". The digital unit (DU) may be a base band unit (BBU), and the RU may be a remote radio head (RRH) or a remote radio unit (RRU). Obviously, the names of the first unit (or the first node) and the second unit (or the second node) are not limited to these examples. Alternatively, the base station 100 may be a single unit (or a single node). In this case, the base station 100 may be one of a number of units mentioned above (for example, one of the first unit and the second unit) and connected to another unit among the number of units (for example, to the other one of the first unit and the second unit).

(2) Terminal Apparatus 200

The terminal apparatus 200 communicates with the base station by radio. For example, when the terminal apparatus 200 is located in the coverage area 10 of the base station 100, the terminal apparatus 200 communicates with the base station 100 by radio. For example, the terminal apparatus 200 is user equipment (UE).

3. FIRST EXAMPLE EMBODIMENT

Next, a first example embodiment of the present invention will be described with reference to FIGS. 2 to 5.

3.1. Configuration of Base Station 100

Figure 2:
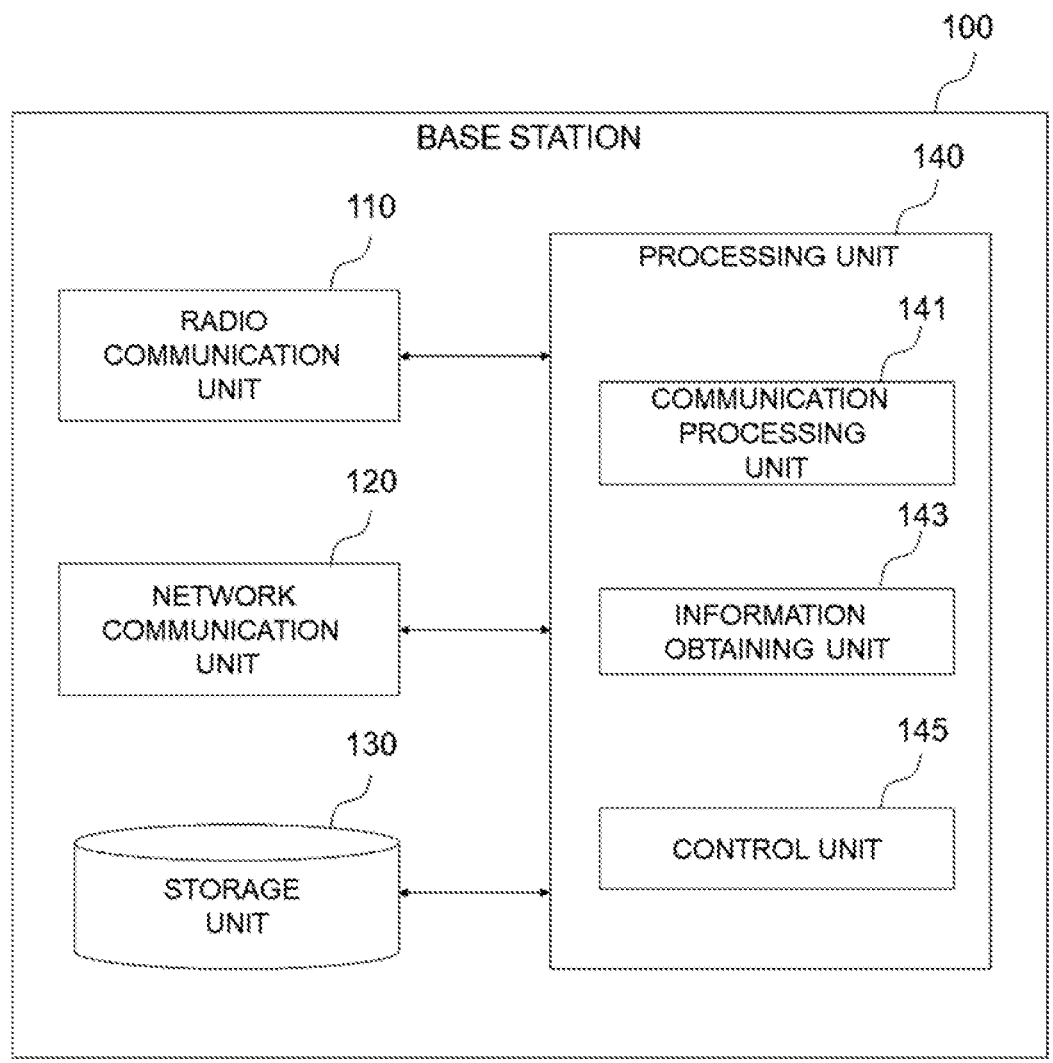
FIG. 2 is a block diagram to show an example of a schematic configuration of a base station 100 according to a first example embodiment.

Next, an example of the configuration of the base station 100 according to the first example embodiment will be described with reference to FIG. 2. FIG. 2 is a block diagram to show an example of a schematic configuration of the base station 100 according to the first example embodiment. Referring to FIG. 2, the base station 100 has a radio communication section 110, a network communication section 120, a storage section 130, and a processing section 140.

(1) Radio Communication Section 110

The radio communication section 110 transmits and receives signals by radio. For example, the radio communication section 110 receives signals from terminal apparatus, and transmits signals to the terminal apparatus.

(2) Network Communication Section 120

The network communication section 120 receives signals from the network, and transmits signals to the network.

(3) Storage Section 130

The storage section 130 temporarily or permanently stores programs (commands) and parameters for the operation of the base station 100, and various data. The program includes one or more commands for the operation of the base station 100.

(4) Processing Section 140

The processing section 140 provides various functions of the base station 100. The processing section 140 includes a communication processing section 141, an information obtaining section 143, and a control section 145. Note that the processing section 140 may further include other components besides these components. That is, the processing section 140 can perform operations other than the operations of these components. Specific operations of the communication processing section 141, the information obtaining section 143 and the control section 145 will be described in detail later.

For example, the processing section 140 (communication processing section 141) communicates with terminal apparatus (for example, the terminal apparatus 200) via the radio communication section 110. For example, the processing section 140 (communication processing section 141) communicates with other network nodes via the network communication section 120.

(5) Implementation Example

The radio communication section 110 may be implemented by an antenna, a high frequency (radio frequency (RF)) circuit, and so forth, and this antenna may be a directional antenna. The network communication section 120 may be implemented by a network adapter, a network interface card, and/or the like. The storage section 130 may be implemented by a memory (for example, a non-volatile memory and/or a volatile memory), a hard disk, and/or the like. The processing section 140 may be implemented by one or more processors, such as baseband (BB) processors and/or other types of processors. The communication processing section 141, the information obtaining section 143 and the control section 145 may be implemented by the same processor or may be implemented separately by different processors. The memory (storage section 130) may be included in the one or more processors, or may be outside the one or more processors.

The base station 100 may include a memory that stores a program (command) and one or more processors that can execute the program (command). The one or more processors may execute the program, and perform the operation of the processing section 140 (perform the operations of the communication processing section 141, the information obtaining section 143, and/or the control section 145). The program may be a program to cause a processor to execute the operation of the processing section 140 (the operations of the communication processing section 141, the information obtaining section 143, and/or the control section 145).

Note that the base station 100 may be virtualized. That is, the base station 100 may be implemented as a virtual machine. In this case, the base station 100 (virtual machine) may operate as a virtual machine on a physical machine (hardware) including a processor, a memory and so forth, or on a hypervisor.

3.2. Configuration of Terminal Apparatus 200

Figure 3:
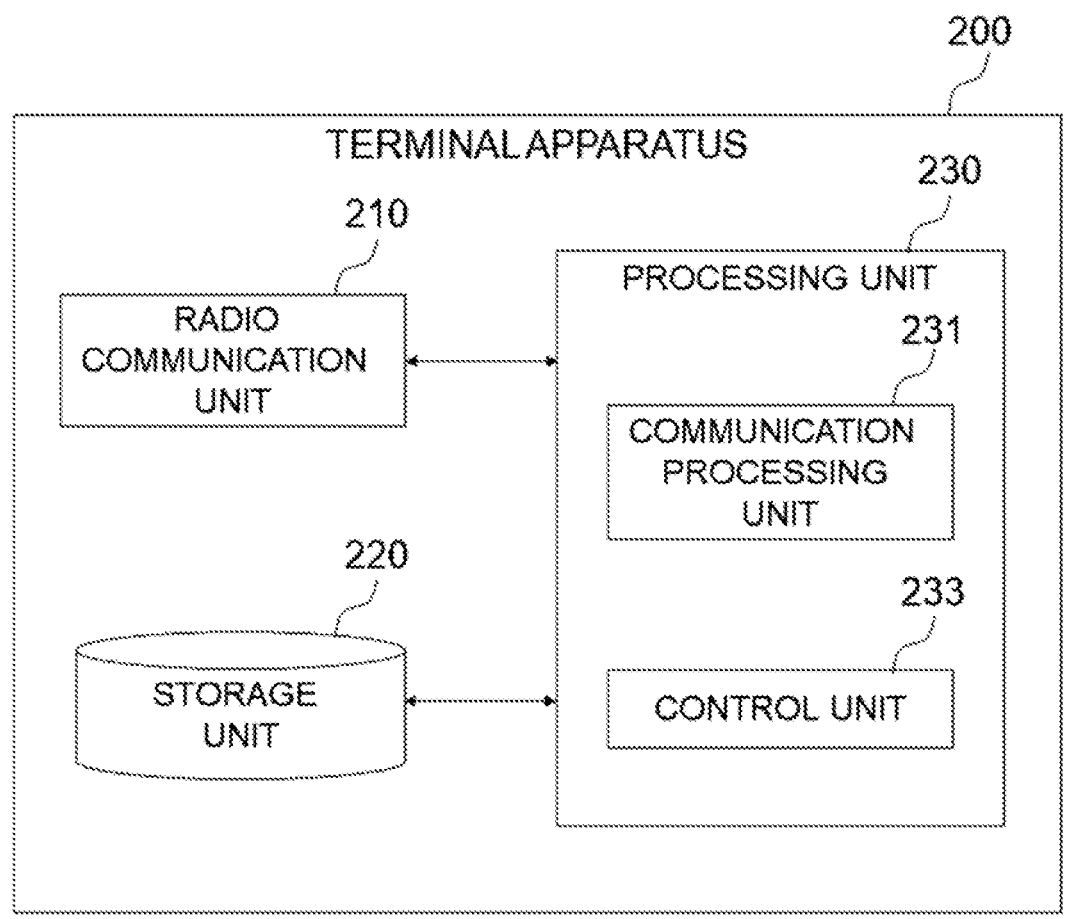
FIG. 3 is a block diagram to show an example of a schematic configuration of terminal apparatus 200 according to the first example embodiment.

Next, an example of the configuration of the terminal apparatus 200 according to the first example embodiment will be described with reference to FIG. 3. FIG. 3 is a block diagram to show an example of a schematic configuration of the terminal apparatus 200 according to the first example embodiment. Referring to FIG. 3, the terminal apparatus 200 has a radio communication section 210, a storage section 220, and a processing section 230.

(1) Radio Communication Section 210

The radio communication section 210 transmits and receives signals by radio. For example, the radio communication section 210 receives signals from a base station 100, and transmits signals to the base station 100.

(2) Storage Section 220

The storage section 220 temporarily or permanently stores programs (commands) and parameters for the operation of the terminal apparatus 200, and various data. The program includes one or more commands for the operation of the terminal apparatus 200.

(3) Processing Section 230

The processing section 230 provides various functions of the terminal apparatus 200. The processing section 230 includes a communication processing section 231, and a control section 233. Note that the processing section 230 may further include other components besides these components. That is, the processing section 230 can perform operations other than the operations of these components. Specific operations of the communication processing section 231 and the control section 233 will be described in detail later.

For example, the processing section 230 (communication processing section 231) communicates with the base station 100 via the radio communication section 210.

(4) Implementation Example

The radio communication section 210 may be implemented by an antenna, a high frequency (RF) circuit, and/or the like. The storage section 220 may be implemented by a memory (for example, a non-volatile memory and/or a volatile memory), a hard disk, and/or the like. The processing section 230 may be implemented by one or more processors, such as baseband (BB) processors and/or other types of processors. The communication processing section 231 and the control section 233 may be implemented by the same processor, or may be implemented separately by different processors. The memory (storage section 220) may be included in the one or more processors, or may be outside the one or more processors. In one example, the processing section 230 may be implemented in a system on chip (SoC).

The terminal apparatus 200 may include a memory that stores a program (command) and one or more processors that can execute the program (command). The one or more processors may execute the program, and perform the operation of the processing section 230 (perform the operations of the communication processing section 231 and the control section 233). The program may be a program to cause a processor to execute the operation of the processing section 230 (the operations of the communication processing section 231 and the control section 233).

3.3. Technical Features

Next, technical features of the first example embodiment will be described.

The base station 100 (information obtaining section 143) obtains downlink channel information based on a downlink channel estimate and uplink channel information based on an uplink channel estimate. Then, the base station 100 (control section 145) performs control related to transmission in a downlink channel based on the correlation between the downlink channel information and the uplink channel information.

(1) Downlink Channel Information

The downlink channel information is information that is derived, for example, by the base station 100 (information obtaining section 143), based on the downlink channel estimate. Hereinafter, the downlink channel estimate will be described first.

To be more specific, the downlink channel estimate is an estimate to indicate downlink transmission path quality. Also, information related to the downlink channel estimate is, for example, transmitted from the terminal apparatus 200 (communication processing section 231) in the uplink. That is, the base station 100 (communication processing section 141) receives the information related to the downlink channel estimate from the terminal apparatus 200 (communication processing section 231) in the uplink.

To be more specific, the downlink channel estimate refers to a value estimated, for example, by the terminal apparatus 200 (control section 233), based on a downlink reference signal transmitted by the base station 100 in the downlink.

Here, for example, a channel state information reference signal (CSI-RS) is used as the downlink reference signal. That is, the terminal apparatus 200 (control section 233) measures the signal strength of the CSI-RS transmitted from the base station 100 in the downlink, and/or the like, and calculates the downlink channel estimate based on this measurement result.

The base station 100 (information obtaining section 143) may obtain, for example, the downlink channel estimate received in the uplink from the terminal apparatus 200, as the information related to the downlink channel information.

In particular, the base station 100 (information obtaining section 143) may obtain, for example, the average of a number of downlink channel estimates, as the information related to the downlink channel information.

A number of downlink channel estimates here refer to values estimated based on a number of downlink reference signals transmitted at downlink radio resource positions defined in at least one of the time and frequency directions. A number of downlink reference signals here refer to, for example, a number of CSI-RSs that are transmitted in a number of resource elements, included in a physical resource block (PRB), a resource block group (RBG), a system bandwidth and/or the like, used in the downlink. That is, the downlink channel information may be the average of a number of downlink channel estimates that are estimated based on a number of downlink reference signals.

(2) Uplink Channel Information

The uplink channel information is, for example, information that is derived based on an uplink channel estimate. Hereinafter, the uplink channel estimate will be described first.

To be more specific, the uplink channel estimate is an estimate to indicate uplink transmission path quality. To be more specific, the uplink channel estimate refers to a value estimated, for example, by the base station 100, based on an uplink reference signal transmitted from the terminal apparatus 200 (communication processing section 231) in the uplink.

Here, for example, a sounding reference signal (SRS) is used as the uplink reference signal. That is, the base station 100 (e.g. information obtaining section 143) measures the signal strength of the SRS transmitted from the terminal apparatus 200 in the uplink, and/or the like, and calculates the uplink channel estimate based on this measurement result.

The base station 100 (information obtaining section 143) may obtain, for example, the uplink channel estimates as the uplink channel information.

In particular, the base station 100 (information obtaining section 143) may obtain, for example, the average of a number of uplink channel estimates, as the uplink channel information.

A number of uplink channel estimates here refer to values estimated based on a number of uplink reference signals transmitted at uplink radio resource positions defined in at least one of the time and frequency directions. A number of uplink reference signals here refer to, for example, a number of SRSs that are transmitted in a number of resource elements, included in a physical resource block (PRB), a resource block group (RBG), a system bandwidth and/or the like, used in the uplink. That is, the uplink channel information may be the average of a number of uplink channel estimates that are estimated based on a number of SRSs.

(3) Control Related to Transmission in Downlink Channel

The base station 100 (control section 145) performs control related to transmission in a downlink channel, based on the correlation between the downlink channel information and the uplink channel information.

To be more specific, when the base station 100 and the terminal apparatus 200 each have a large number of antenna elements, control related to transmission in a downlink channel is performed as follows.

First, the base station 100 (control section 145) calculates, for example, UL-DL channel reciprocity, as an indicator to evaluate how much the downlink channel information and the uplink channel information that correspond to each terminal apparatus (for example, terminal apparatus 200) located in the coverage area 10 match each other.

Then, using the UL-DL channel reciprocity calculated per terminal apparatus, the base station 100 (control section 145) allocates time/frequency resources to each terminal apparatus in the downlink, determines the number of terminals to be MU-MIMO-multiplexed in the downlink, selects the terminals to be multiplexed, determines the number of layers per terminal apparatus, selects the MCS for each layer, controls transmission power for each layer, and calculates downlink beamforming/precoding weights for each layer.

(4) Reporting of Information

For example, before obtaining the downlink channel estimates, the base station 100 (communication processing section 141) may transmit information about the positions of the radio resources where the uplink reference signals used to obtain the uplink channel estimates are allocated, to the terminal apparatus 200.

Here, the positions of the radio resources (resource elements) where the uplink reference signals (for example, SRSs) are allocated are the positions of radio resources (resource elements) that are determined based on the positions of the radio resources where the downlink reference signals (CSI-RSs) are allocated.

For example, the position of a resource element where an SRS is allocated is determined so as to be included in the range of one subframe in the front and rear directions along the time axis, with respect to the position of a resource element where a CSI-RS is allocated.

By this means, the CSI-RS and the SRS are transmitted substantially at the same time, so that the correlation between the downlink channel information and the uplink channel information—that is, UL-DL channel reciprocity—can be calculated more accurately.

3.4. Example

Next, examples of the first example embodiment will be described.

First, m pieces of terminal apparatus 200 (communication processing sections 231) (where m is a natural number from 0 to N.) each generate an SRS, and transmit this SRS in the uplink by using radio resource specified by the base station 100. Here, when the radio communication section 210 of terminal apparatus 200 has a number of transmitting antennas, the terminal apparatus 200 (communication processing section 231) may generate different SRSs per transmitting antenna (transmitter), and transmit these SRSs in the uplink.

On the other hand, the base station 100 (communication processing section 141 and information obtaining section 143) receives the SRSs transmitted from the terminal apparatus 200, and calculates an uplink channel estimate for each receiving antenna (receiver) provided in the radio communication section 110. Here, to improve the accuracy of channel estimation, the base station 100 may perform a process of finding the average of uplink channel estimates in a PRB, an RBG, a system band and so forth, and use this average as uplink channel information. In addition, when the terminal apparatus 200 transmits different SRSs per transmitting antenna, the base station 100 may calculate uplink channel estimates per transmitting antenna of the terminal apparatus 200, and per receiving antenna of the base station 100.

Next, the base station 100 (communication processing section 141) generates different channel estimation signals (CSI-RSs) for each transmitting antenna provided in the radio communication section 110, regardless of individual terminal apparatus, and transmits these channel estimation signals in the downlink.

Meanwhile, the terminal apparatus 200 (communication processing sections 231) receives the CSI-RSs transmitted from the base station 100, and calculates downlink channel estimates that correspond to each transmitting antenna of the base station 100. Here, to improve the accuracy of channel estimation, the terminal apparatus 200 may perform a process of finding the average of downlink channel estimates in a PRB, an RBG, a system band and so forth, and use this average as downlink channel information. Also, when the radio communication section 210 of terminal apparatus 200 has a number of receiving antennas (receivers), the terminal apparatus 200 may calculate downlink channel estimates per receiving antenna at the terminal apparatus 200 end, and per transmitting antenna at the base station 100 end.

Next, the terminal apparatus 200 (communication processing sections 231) performs data conversion of information related to downlink channel estimates (for example, downlink channel estimates or downlink channel information) into a transmission format for a physical uplink shared channel (PUSCH) or a physical uplink control channel (PUCCH). In this transmission format, the information related to downlink channel estimates may be subject to processes for reducing the number of bits, such as compression, discretization and so on.

Meanwhile, the base station 100 (communication processing section 141 and information obtaining section 143) receives the information related to downlink channel estimates, transmitted from each terminal apparatus 200. Then, the base station 100 (control section 145) determines the UL-DL channel reciprocity by, for example, calculating the correlation of each antenna, in each PRB, by using the downlink channel information and the uplink channel information. Furthermore, the base station 100 (control section 145) performs control related to communication in the downlink, based on the result of whether the UL-DL channel reciprocity determined in relationship to each terminal apparatus 200 is good or not. That is, using the UL-DL channel reciprocity calculated per terminal apparatus 200, the base station 100 allocates time/frequency resources to each terminal apparatus in the downlink, determines the number of terminals to be MU-MIMO-multiplexed in the downlink, selects the terminals to be multiplexed, determines the number of layers per terminal apparatus, selects the MCS for each layer, controls transmission power for each layer, and calculates downlink beamforming/precoding weights for each layer, and the like.

The transmission schedule of each reference signal

Figure 4:
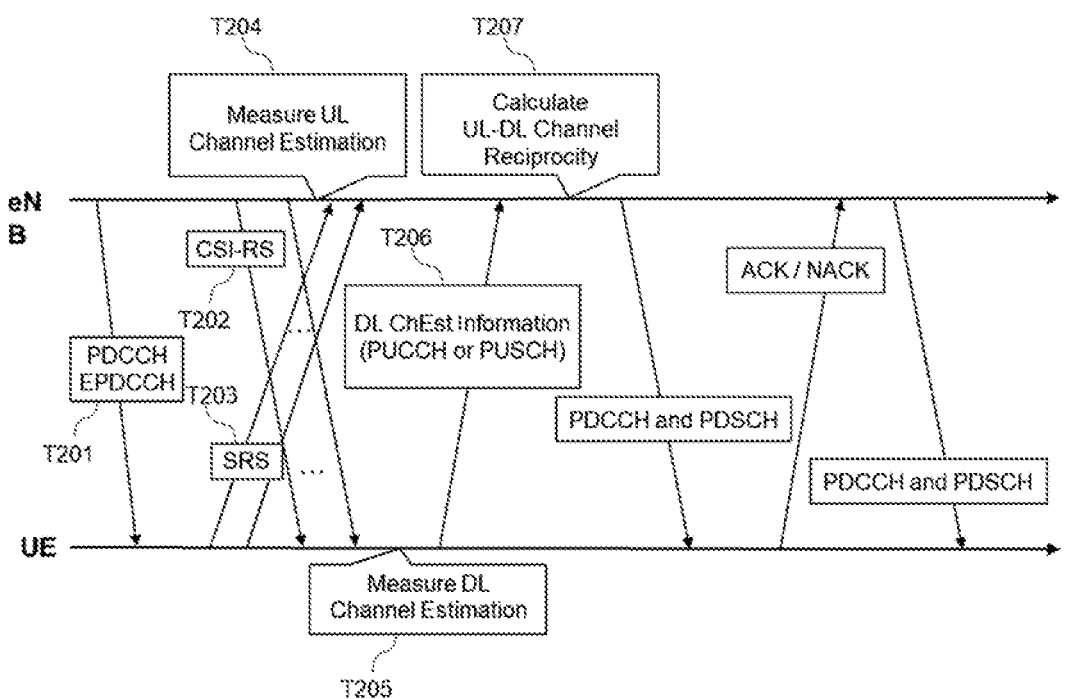
FIG. 4 is a time chart diagram to show the transmission schedule of each signal transmitted in the downlink and the uplink.

Next, the transmission schedule of each signal will be described with reference to FIG. 4. FIG. 4 is a time chart diagram to show the transmission schedule of each signal transmitted in the downlink and the uplink.

First, at timing T201, the base station 100 (eNB) reports the SRS transmission timing to terminal apparatus 200 (UE), by using a PDCCH or an enhanced physical downlink control channel (EPDCCH). Note that, at this timing T201, the base station 100 (communication processing section 141) may also report the timing for transmitting the information related to downlink channel estimates, to the terminal apparatus 200 (UE).

Next, at timing T202 and timing T203, which are nearly the same time, the base station 100 and the terminal apparatus both transmit reference signals (RSs). That is, the base station 100 transmits a CSI-RS at timing T202, and the terminal apparatus 200 transmits an SRS at timing T203.

Next, at timing T204, the base station 100 (eNB) calculates an uplink channel estimate based on the SRS's measurement result. Meanwhile, at timing T205, the terminal apparatus 200 calculates a downlink channel estimate based on the CSI-RS's measurement result.

Following this, at timing T206, the terminal apparatus 200 transmits information related to the downlink channel estimate, to the base station 100, via a physical uplink control channel (PUCCH) or a physical uplink shared channel (PUSCH), to give the downlink channel estimate as feedback.

Then, at timing 207, the base station 100 calculates UL-DL channel reciprocity, and performs control related to transmission in the downlink channel, such as scheduling and beamforming in the downlink, by using this result.

Note that the terminal apparatus 200 (UE) may transmit both the CSI-RS and the SRS periodically, regardless of transmission timings such as timing T202 and timing T203. For example, according to LTE standards, the SRS is transmitted with a periodicity of 2 ms at a minimum, and the CSI-RS is transmitted with a periodicity of 5 ms at a minimum. Therefore, the CSI-RS and the SRS may be allocated to resource elements where, for example, the subframe intervals neighbor each other.

Resource Allocation for Each Reference Signal

Figure 5A:
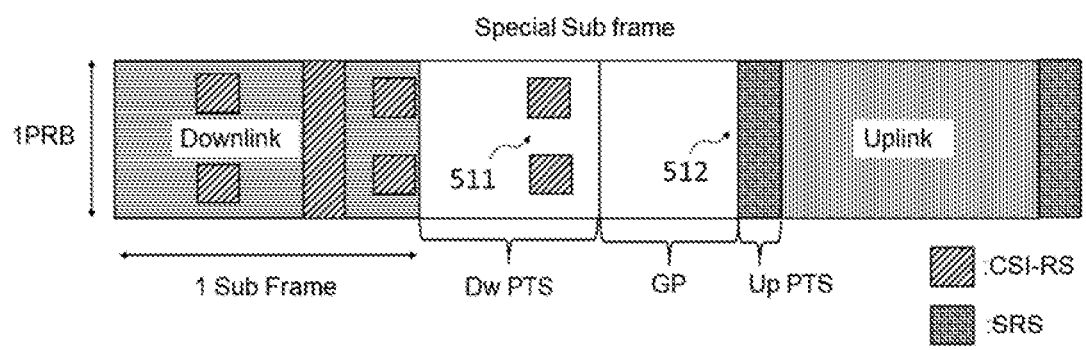
FIGS. 5A-5C are diagrams to show schematic configurations of resource blocks where CSI-RSs and SRSs are allocated, respectively.
Figure 5B:
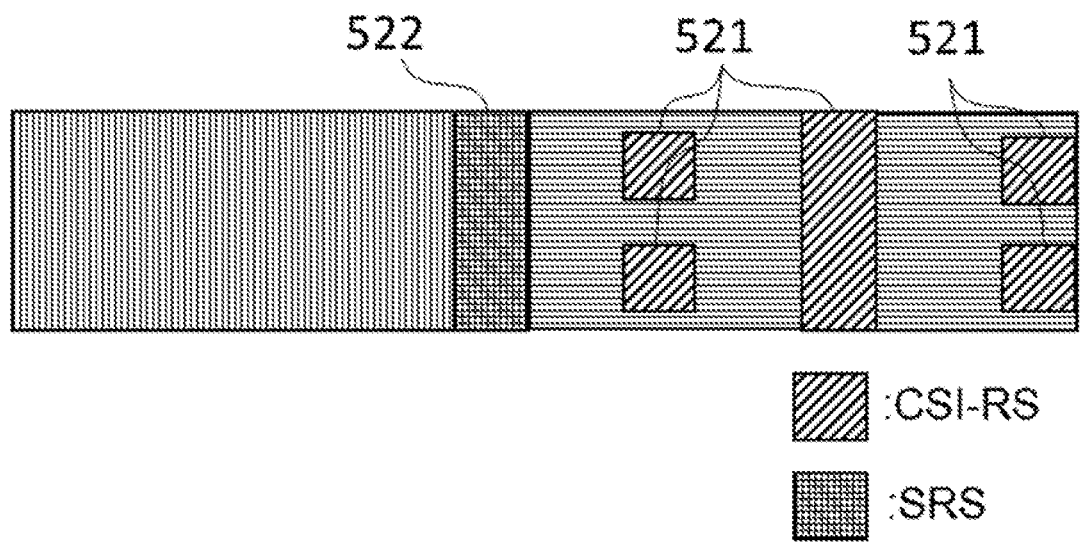
Figure 5C:
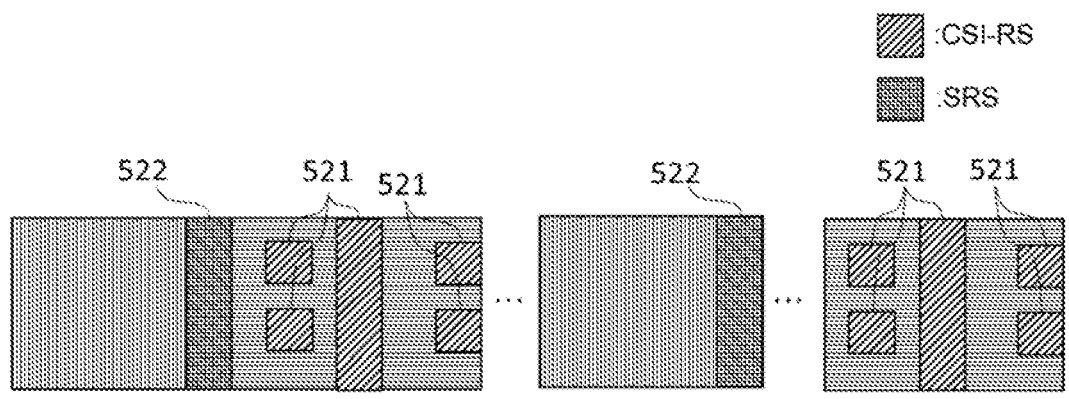

With reference to FIGS. 5A-5C, the configuration of resource allocation for each reference signal (CSI-RS and SRS) will be described. FIGS. 5A-5C are diagrams to show schematic configurations of resource blocks where CSI-RSs and SRSs are allocated, respectively.

For example, FIG. 5A is a diagram to show a specific example of transmitting reference signals using a special subframe in time division duplex (TDD). That is, as shown in FIG. 5A, for example, a CSI-RS 511 is allocated to resource elements of the downlink pilot time slot (DwPTS) in the special subframe. Also, an SRS 512 is allocated to resource elements of the uplink pilot time slot (UpPTS) in the special subframe.

In addition, FIG. 5B and FIG. 5C are diagrams to show specific examples using resources for switching from an uplink subframe to a downlink subframe in TDD. That is, as shown in FIG. 5B, when an uplink subframe is switched to a downlink subframe in TDD, the SRS 522 is allocated to resource elements in the uplink subframe, and the CSI-RS 521 is allocated to resource elements in the downlink subframe near the uplink subframe. Note that, when the process for finding the average of each estimate is performed, for example, given the SRS 522 and the CSI-RS 521 transmitted periodically or aperiodically as shown in FIG. 5C, it is preferable to configure desirable portions of subframes as measurement targets (estimation targets) within a range where channel fluctuation is not significant. For example, one subframe (twelve subcarriers and fourteen symbols) is configured as a measurement target, and, between subframes, a phase correction process and a vector averaging process are performed for each estimate. By this means, it is possible to improve the accuracy of channel estimation.

Also, the number of frequency resources, antenna ports and so forth allocated to terminal apparatus 200 is limited. Therefore, when a number of subframes are obtained, the correlations of uplink/downlink channel information corresponding to all the PRBs and all the antennas are divided over time are used, so that it is possible to perform control related to transmission (including scheduling) in the downlink with higher flexibility.

Specific Example of Control Related to Transmission in an Uplink Channel (Example of Calculation of UL-DL Channel Reciprocity)

For example, the base station 100 (control section 145) can calculate UL-DL channel reciprocity by using, for example, the following equations:

$$UL\text{-}DL \text{ Channel Reciprocity Indicator} \qquad [\text{Math. 1}]$$

$$S(f) = \frac{H_{UL}(f)H_{DL}^H(f)}{|H_{UL}(f)||H_{UL}^H(f)|}$$

$$(UL\text{-}DL\text{-}CH \cdot \text{Reciprocity}) = 20\log_{10}S(f)$$

$$SNR \cdot \text{Indicator}$$

$$N(f) = 1 - S(f)$$

$$SNR(f) = 20\log_{10}\frac{S(f)}{N(f)}$$

$H_{UL}(f)$: •UL•Channel•Estimation•vector
$H_{DL}(f)$: •DL•Channel•Estimation•vector
f: •Frequency•domain
$(\cdot)^H$: •Hermitian•Transpose•Matrix
$(\cdot)^T$: •Transpose•Matrix In the above equations, the UL channel estimation vector is equivalent to the uplink channel information. Also, the DL channel estimation vector is equivalent to the downlink channel information.

(Example of Control Related to Allocation of Time/Frequency Resources)

For example, the base station 100 (control section 145) allocates a PRB or an RBG showing relatively good UL-DL channel reciprocity, preferentially, to time resources where a large number of terminals are multiplexed. To say that "UL-DL channel reciprocity is good" means that the correlation between uplink channel information and downlink channel information is high.

On the other hand, the base station 100 (control section 145) allocates a PRB or an RBG showing relatively poor UL-DL channel reciprocity, preferentially, to time resources where a small number of terminals are multiplexed. Alternatively, the base station 100 allocates this PRB or RBG to mutually different frequency resources. To say that "UL-DL channel reciprocity is poor" means that the correlation between uplink channel information and downlink channel information is low.

(Example of Control Related to Selection of Terminals to be Multiplexed/Determination of the Number of Terminals to be Multiplexed)

The base station 100 (control section 145) preferentially allocates terminal apparatus that shows relatively good UL-DL channel reciprocity to resources where a large number of terminals are multiplexed.

Also, the base station 100 (control section 145) reduces the number of terminals to be multiplexed with respect to resources allocated to terminal apparatus that shows relatively poor UL-DL channel reciprocity.

(Example of Control Related to Determination of the Number of Layers Per Terminal Apparatus (Rank))

The base station 100 (control section 145) reduces the number of layers (rank) per terminal apparatus with respect to resources allocated to terminal apparatus that shows relatively poor UL-DL channel reciprocity.

(Example of control related to selection of MCS for each layer)

For resources for terminal apparatus that shows relatively poor UL-DL channel reciprocity, the base station 100 (control section 145) uses smaller MCSs for such resources.

(Example of Control Based on Transmission Power)

Given the possibility that the transmission power for terminal apparatus that shows relatively poor UL-DL channel reciprocity may not be optimal, the base station 100 (control section 145) adjusts the transmission power based on channel quality indicators (CQIs), which are calculated at the terminal apparatus end by using DL demodulation reference signals (DM-RSs) and transmitted, calculates UL-DL channel reciprocity again based on uplink channel information and downlink channel information, and performs control related to transmission in the downlink.

Effects

The present example provides, for example, the following effects:

According to the present example, for example, control that relates to transmission in the downlink is performed based on UL-DL channel reciprocity, which indicates the transmission path reciprocity between base stations and terminal apparatus, so that, even when the transmission path reciprocity is deteriorated, it is still possible to reduce the increase in the data decoding error rate in terminal apparatus, and prevent the quality of received signals from deteriorating in other terminal apparatus.

Consequently, according to the present example, it is possible to achieve, reliably, high downlink received signal quality and high system throughput.

Other Examples

Next, other examples will be described.

First Example

For example, when terminal apparatus 200 is located at the cell edge (edge of coverage area) of a number of base stations, the number of base stations each calculate UL-DL channel reciprocity. Following this, the base station (for example, base station 100) to aggregate the number of base stations performs scheduling for handover, prioritizing base stations that show relatively good UL-DL channel reciprocity. By this means, it is possible to achieve high downlink received signal quality and high downlink system throughput.

Second Example

For example, when carrier aggregation is possible between terminal apparatus 200 and a base station 100, the base station 100 selects the component carriers (CCs) for performing carrier aggregation by using the UL-DL channel reciprocity calculated for each PRB or RBG. By this means, it is possible to achieve high downlink received signal quality and high downlink system throughput.

Third Example

When beamforming is performed using beams that are selected from a number of fixed beams (downlink antenna weights) with reference to a codebook, a base station 100 calculates UL-DL channel reciprocity based on downlink channel estimates and uplink channel estimates, which are estimated from beams corresponding to each codebook index. Then, even if no downlink channel information is provided, the base station 100 can easily select a sub-optimal downlink weight by selecting the codebook index with the best UL-DL channel reciprocity, so that it is possible to achieve relatively high downlink received signal quality and relatively high downlink system throughput.

Fourth Example

As to what measurement targets are used to calculate UL-DL channel reciprocity, not only a wideband (whole system band), but also subbands (parts of a band) may be used. By this means, it is possible to reduce the amount of calculation.

Fifth Example

Transmission power may not be optimal in terminal apparatus where the UL-DL channel reciprocity is deteriorated. Consequently, optimal transmission power control is performed based on UL-DL channel reciprocity that is calculated by measuring UL/DL channels in which transmission power is adjusted with a short periodicity, so that it is possible to achieve high downlink received signal quality and high downlink system throughput in DL MU-MIMO.

Sixth Example

If the transmission and receiving timings in either the uplink and/or the downlink do not match, UL-DL channel reciprocity is deteriorated. Therefore, the base station 100 controls uplink and/or downlink transmission timings based on the result of whether the UL-DL channel reciprocity is good or not, so that it is possible to achieve reliable communication quality.

4. SECOND EXAMPLE EMBODIMENT

Figure 6:
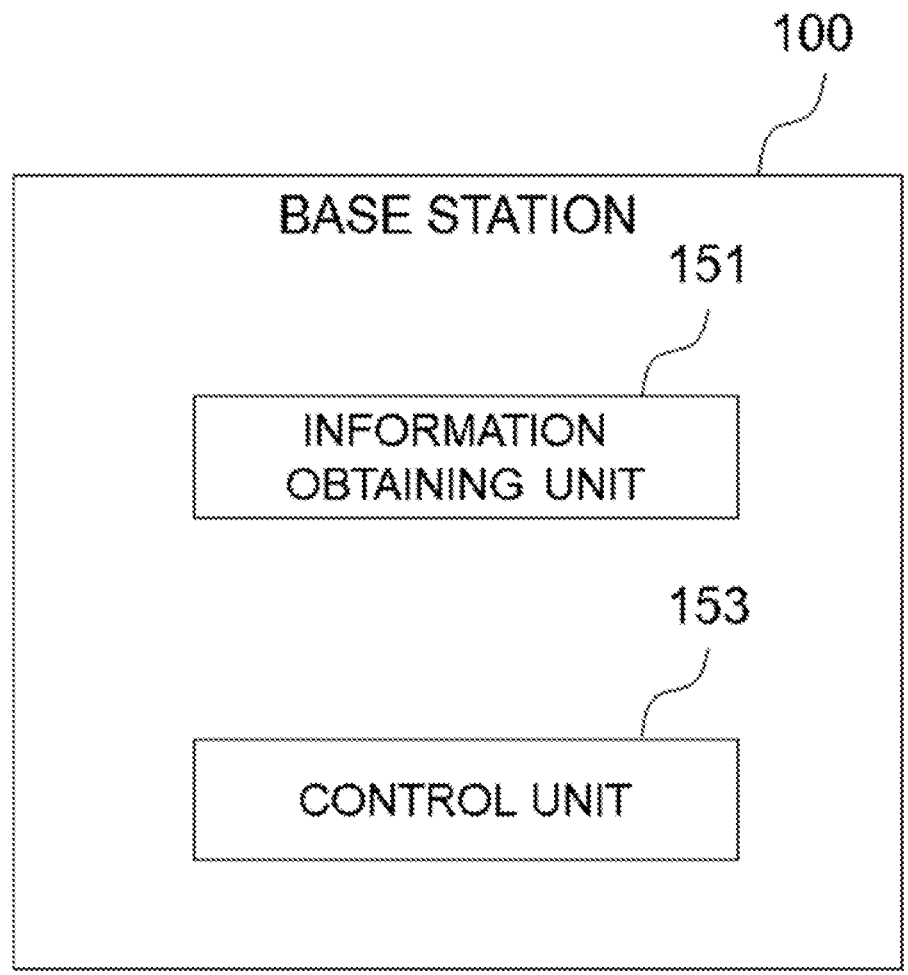
FIG. 6 is a block diagram to show an example of a schematic configuration of the base station 100 according to a second example embodiment.

Next, a second example embodiment of the present invention will be described with reference to FIG. 6. Although the first example embodiment described above is a specific example embodiment, the second example embodiment is a more generalized example embodiment.

4.1. Configuration of Base Station 100

First, an example of the configuration of the base station 100 according to the second example embodiment will be described with reference to FIG. 6. FIG. 6 is a block diagram to show an example of a schematic configuration of the base station 100 according to the second example embodiment. Referring to FIG. 6, the base station 100 includes an information obtaining section 151 and a control section 153. Specific operations of the information obtaining section 151 and the control section 153 will be described later.

The communication processing section 151 and the control section 153 may be implemented by the same processor or may be implemented separately by different processors. The information obtaining section 151 and the control section 153 may include a memory that stores a program (command) and one or more processors that can execute the program (command), and the one or more processors may perform the operation of the information obtaining section 151 and the control section 153. The program may be a program to cause the processors to execute the operations of the information obtaining section 151 and the control section 153.

Note that each of the above-described processors may be, for example, a virtual processor implemented by a hypervisor installed in a general-purpose computer, and/or the like. Also, each of the memories described above may be, for example, a virtual processor implemented by a hypervisor installed in a general-purpose computer, and/or the like.

4.2. Technical Features

Next, technical features of the second example embodiment will be described.

In the second example embodiment, the base station 100 (information obtaining section 151) obtains downlink channel information based on a downlink channel estimate and uplink channel information based on an uplink channel estimate. Then, the base station 100 (control section 153) performs control related to transmission in a downlink channel based on the correlation between the downlink channel information and the uplink channel information.

For example, the information obtaining section 151 may perform the operation of the information obtaining section 143 according to the first example embodiment described above. Also, the control section 153 may perform the operation of the control section 145 according to the first example embodiment described above.

The second example embodiment has been described above. According to the second example embodiment, for example, even when the channel reciprocity that is established between the uplink and the downlink is deteriorated, it is still possible to properly perform control related to transmission in the downlink.

5. OTHER EXAMPLE EMBODIMENTS

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

For example, the steps in the processes described in the Specification do not necessarily have to be executed in chronological order according to the order described in the sequence diagram. For example, the steps in the processes may be executed in an order different from the order illustrated in the sequence diagram, or may be executed in parallel. Also, some of the steps in the processes may be deleted, or additional steps may be added to the processes.

Also, apparatus to have the components of base stations described in the Specification (for example, the information obtaining section and/or the control section) (for example, one or more pieces of apparatus (or units) among a number of pieces of apparatus (or units) that constitute a base station, or a module for one of the pieces of apparatus (or units)) may be provided. Furthermore, a method to include processes by these components may be provided, and a program to cause a processor to execute processes in these components may be provided. Also, a non-transitory computer-readable recording medium that records this program may be provided. Obviously, such apparatus, module, method, program, and non-transitory computer-readable recording medium are included in the present invention.

Some of or all of the above-described example embodiments can be described as in the following supplementary notes, but are not limited to the following.

(Supplementary Note 1)

A base station comprising:

an information obtaining unit configured to obtain downlink channel information based on a downlink channel estimate, and uplink channel information based on an uplink channel estimate; and a control unit configured to perform control related to transmission in downlink channel based on a correlation between the downlink channel information and the uplink channel information.

(Supplementary Note 2)

The base station according to Supplementary Note 1, further comprising a communication processing unit configured to receive information related to the downlink channel estimate from a terminal apparatus in the uplink.

(Supplementary Note 3)

The base station according to Supplementary Note 1 or 2, wherein the downlink channel estimate is a value estimated based on a downlink reference signal transmitted by the base station in the downlink.

(Supplementary Note 4)

The base station according to Supplementary Note 3, wherein the downlink channel information is information related to an average of a plurality of downlink channel estimates based on a plurality of downlink reference signals transmitted at a radio resource position in the downlink defined in at least one of a time and frequency directions.

(Supplementary Note 5)

The base station according to Supplementary Note 3 or 4, wherein the downlink reference signal is Channel State Information (CSI)-Reference Signal (RS).

(Supplementary Note 6)

The base station according to any one of Supplementary Notes 1 to 5, wherein the uplink channel estimate is a value estimated based on an uplink reference signal transmitted by a terminal apparatus in the uplink.

(Supplementary Note 7)

The base station according to Supplementary Note 6, wherein the uplink channel information is information derived based on an average of a plurality of uplink channel estimates based on a plurality of uplink reference signals transmitted at a radio resource position in the uplink defined in at least one of a time and frequency directions.

(Supplementary Note 8)

The base station according to Supplementary Note 6 or 7, wherein the uplink reference signal is Sounding Reference Signal (SRS).

(Supplementary Note 9)

The base station according to any one of Supplementary Notes 6 to 8, further comprising a communication processing unit configured to transmit, to the terminal apparatus, information related to a position of a radio resource to which the uplink reference signal is allocated.

(Supplementary Note 10)

The base station according to Supplementary Note 9, wherein the downlink channel estimate is a value estimated based on a downlink reference signal transmitted by the base station in the downlink, and the position of the radio resource to which the uplink reference signal is allocated is a position of a radio resource determined based on a position of a radio resource to which the downlink reference signal is allocated.

(Supplementary Note 11)

A method comprising:

obtaining downlink channel information based on a downlink channel estimate, and uplink channel information based on an uplink channel estimate; and performing control related to transmission in downlink channel based on a correlation between the downlink channel information and the uplink channel information.

(Supplementary Note 12)

A program that causes a processor to execute:

obtaining downlink channel information based on a downlink channel estimate, and uplink channel information based on an uplink channel estimate; and performing control related to transmission in downlink channel based on a correlation between the downlink channel information and the uplink channel information.

(Supplementary Note 13)

A non-transitory computer-readable recording medium storing a program that causes a processor to execute:

obtaining downlink channel information based on a downlink channel estimate, and uplink channel information based on an uplink channel estimate; and performing control related to transmission in downlink channel based on a correlation between the downlink channel information and the uplink channel information.

This application claims the priority on the basis of Japanese Patent Application No. 2018-046388, filed on Mar. 14, 2018, and the disclosure including the specification, drawings and abstract, is incorporated herein by reference in its entirety.

INDUSTRIAL APPLICABILITY

According to the present invention, even when the channel reciprocity that is established between the uplink and the downlink is deteriorated, it is still possible to properly perform control related to transmission in the downlink.

REFERENCE SIGNS LIST

1 System
100 Base station
141, 231 Communication processing section
143, 151 Information obtaining section
145, 153, 233 Control section
200 Terminal apparatus

What is claimed is:

1. A base station comprising:
a memory storing instructions; and
one or more processors configured to execute the instructions to:
obtain downlink channel information based on a downlink channel estimate, and uplink channel information based on an uplink channel estimate; and
perform control related to transmission in downlink channel based on a correlation between the downlink channel information and the uplink channel information, wherein
the control including allocating a radio resource showing higher correlation between the downlink channel information and the uplink channel information, preferentially, to a radio resource where a larger number of terminal apparatuses communicating with the base station is multiplexed.

2. The base station according to claim 1, wherein the one or more processors are configured to execute the instructions to further receive information related to the downlink channel estimate from a terminal apparatus in the uplink.

3. The base station according to claim 1, wherein the downlink channel estimate is a value estimated based on a downlink reference signal transmitted by the base station in the downlink.

4. The base station according to claim 3, wherein the downlink channel information is information related to an average of a plurality of downlink channel estimates based on a plurality of downlink reference signals transmitted at a radio resource position in the downlink defined in at least one of a time and frequency directions.

5. The base station according to claim 3, wherein the downlink reference signal is Channel State Information (CSI)-Reference Signal (RS).

6. The base station according to claim 1, wherein the uplink channel estimate is a value estimated based on an uplink reference signal transmitted by a terminal apparatus in the uplink.

7. The base station according to claim 6, wherein the uplink channel information is information derived based on an average of a plurality of uplink channel estimates based on a plurality of uplink reference signals transmitted at a radio resource position in the uplink defined in at least one of a time and frequency directions.

8. The base station according to claim 6, wherein the uplink reference signal is Sounding Reference Signal (SRS).

9. The base station according to claim 6, wherein the one or more processors are configured to execute the instructions to further transmit, to the terminal apparatus, information related to a position of a radio resource to which the uplink reference signal is allocated.

10. The base station according to claim 9, wherein
the downlink channel estimate is a value estimated based on a downlink reference signal transmitted by the base station in the downlink, and
the position of the radio resource to which the uplink reference signal is allocated is a position of a radio resource determined based on a position of a radio resource to which the downlink reference signal is allocated.

11. A method comprising:
obtaining downlink channel information based on a downlink channel estimate, and uplink channel information based on an uplink channel estimate; and
performing control related to transmission in downlink channel based on a correlation between the downlink channel information and the uplink channel information, wherein
the control including allocating a radio resource showing higher correlation between the downlink channel information and the uplink channel information, preferentially, to a radio resource where a larger number of terminal apparatuses communicating with the base station is multiplexed.

12. A non-transitory computer-readable recording medium storing a program that causes a processor to execute:
obtaining downlink channel information based on a downlink channel estimate, and uplink channel information based on an uplink channel estimate; and
performing control related to transmission in downlink channel based on a correlation between the downlink channel information and the uplink channel information, wherein
the control including allocating a radio resource showing higher correlation between the downlink channel information and the uplink channel information, preferentially, to a radio resource where a larger number of terminal apparatuses communicating with the base station is multiplexed.

* * * * *